(No Model.)
W. T. BATE.
VALVE FOR GAS APPARATUS.
No. 357,896. Patented Feb. 15, 1887.
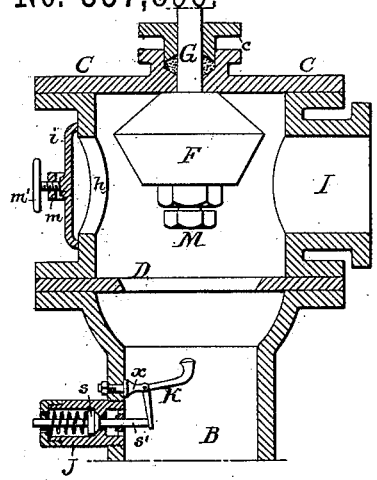
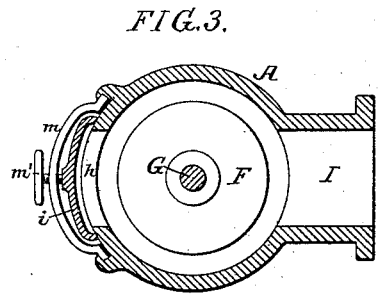
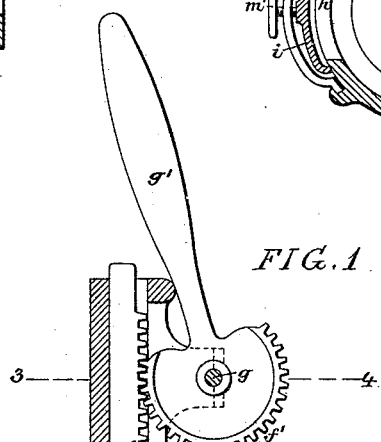
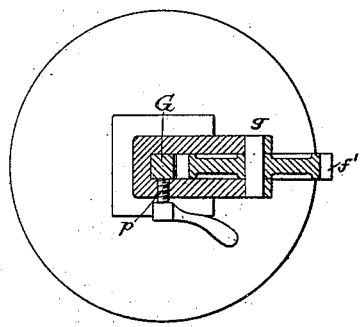
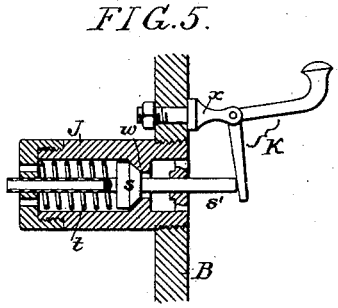
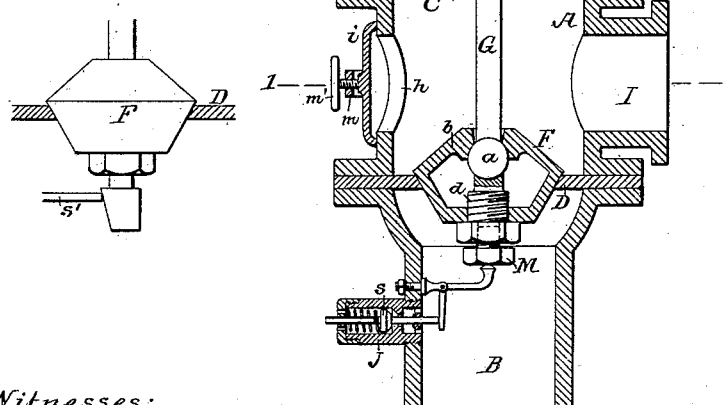
Witnesses:
John E. Parker
David S. Williams
Inventor:
William T. Bate
by his Attorneys
Howson & Son
N. PETERS, Photo-Lithographer, Washington, D. C.

UNITED STATES PATENT OFFICE.

WILLIAM T. BATE, OF CONSHOHOCKEN, PENNSYLVANIA.

VALVE FOR GAS APPARATUS.

SPECIFICATION forming part of Letters Patent No. 357,896, dated February 15, 1887.

Application filed January 11, 1886. Serial No. 188,236. (No model.)

*To all whom it may concern:*

Be it known that I, WILLIAM T. BATE, a citizen of the United States, residing in Conshohocken, Montgomery county, Pennsylvania, have invented certain Improvements in Valves for Gas Apparatus, of which the following is a specification.

My invention relates to valves such as are used to control the flow of air to furnaces of gas-generating apparatus, the objects of my invention being to prevent the accumulation of carbon upon the seat of the valve to such an extent as to interfere with the proper closing of said valve, to provide for the ready cleansing of the valve and seat when necessary, to permit the valve to accomodate itself to slight inequalities in the seat, and to prevent the accumulation of gas in the pipe leading to the blast apparatus. These objects I attain in the manner hereinafter set forth, reference being had to the accompanying drawings, in which—

Figure 1 is a vertical section, partly in elevation, of a valve constructed in accordance with my invention; Fig. 2, a section of part of the same on a larger scale; Fig. 3, a sectional plan on the line 1 2, Fig. 1; Fig. 4, a sectional plan on a larger scale on the line 3 4, Fig. 1; Fig. 5, an enlarged vertical section of part of Fig. 1, and Fig. 6 a view showing a modification of one feature of the invention.

A is the casing of the valve, which is flanged at the bottom and secured to the air-supply pipe B, a plate, D, forming a valve-seat, being clamped between the two flanges. This plate D has a central conical opening for the reception of a conical valve, F, which is hung to the lower end of a valve-rod, G, the latter having a spherical enlargement or ball, $a$, which is adapted to a segmental seat, $b$, in the upper portion of the valve, and is retained therein by the concave end of a screw-stem, $d$, adapted to a threaded opening in the bottom of the valve, so that the latter is free to swing on the lower end of the valve-stem to accommodate itself to slight inequalities in the truth of the valve-seat D.

The valve-rod G is adapted to a stuffing-box, $c$, on the cover-plate C of the valve-chest, and has near the upper end a rack, $f$, with which engages a toothed segment, $f'$, carried by a spindle, $g$, adapted to bearings in brackets on a tubular stem, H, secured to and projecting upward from said cover-plate, this segment being provided with an operating-handle, $g'$, so that the valve can be readily raised or lowered to open or cut off communication between the supply-pipe B and the discharge-branch I of the valve-casing.

In valves for controlling the flow of air to the furnaces of gas-generating apparatus there is likely to be a deposit of fine carbon on the seat of the valve, and in valves of the ordinary construction this accumulation in time prevents the valve from properly seating itself, and a leakage of air or gas is thereby permitted. I overcome this objection by making the valve-seat and valve conical, so that there is no opportunity for the lodgment of carbon on the seat. As carbon may, however, accumulate on the horizontal portion of the seat-plate D, I provide the valve-casing A with an opening, $h$, which is closed under ordinary circumstances by a cover-plate, $i$, retained on its seat by a yoke, $m$, and set-screw $m'$, in the usual manner, so that it can be readily removed when it becomes necessary to gain access to the interior of the valve-casing for the purpose of clearing off the seat-plate D, or for other purposes.

The valve-rod G is made in sections, connected together by a sleeve, $n$, so that the lower section, carrying the valve, can be readily disconnected from the upper section.

The handle $g'$ of the toothed segment $f'$ is of such weight as to counterbalance the weight of the valve and valve-rod, and when the valve is closed to its seat said handle occupies such relation to a vertical line drawn through the shaft $g$ that the weight of the handle is exerted to prevent the accidental lifting of the valve. As an additional means of retaining the valve in either of its positions, however, I employ a binding-screw, $p$, bearing against the side of the valve-rod, as shown in Fig. 4.

In order to prevent the accumulation of gas in the supply-pipe B in the event of the leakage of gas between the valve and its seat due to any imperfection in either, I secure to one side of said pipe B a casing, J, in which is a valve, $s$, acted on by a spring, $t$, which tends to close it against the seat $w$ in the casing.

The stem $s'$ of the valve projects into the pipe B, and is in contact with one arm of a bell-crank lever K, hung to a bracket, $x$, in said pipe, the other arm of said lever, when the valve F is closed to its seat, being struck by the head of a set-screw, M, carried by the valve, and thereby depressed so as to move the valve $s'$ away from its seat and permit the escape through the casing J and hollow valve-stem $s'$ of any gas which may find its way into the pipe B. On the rise of the valve F the valve $s$ is closed to its seat by the action of the spring $t$, and the escape of air or gas is prevented.

A wedge-block carried by the valve—as shown in Fig. 6, for instance—may take the place of the bell-crank lever; but the latter is preferred.

I am aware that valve-casings have been provided with special dust-chambers with removable covers; but in my improved valve the opening is directly in the main valve-chamber, so that all portions of the valve-chamber and the valve are readily accessible on removing the cover.

I am also aware that a flexible connection between the valve and valve-stem is not new, this particular feature of my invention being limited to the ball-and-socket connection of such character as to provide a universal joint for the valve, and valves have been heretofore made in which the main valve in closing to its seat opened a small tapping or drain valve, the novel feature of this portion of my invention being the placing of the valve-opening and valve laterally in order that it may be used in the pipe beneath the valve-seat.

I therefore claim as my invention—

1. The combination of the air-supply pipe B with the valve-casing A, having a bottom inlet, side outlet, and opposite side opening provided with a detachable cover, and with a valve adapted to close the inlet at the bottom of the casing, all substantially as specified.

2. The combination of the casing having a valve-seat, the valve-rod having a spherical enlargement at the lower end, the valve having a segmental seat therefor, and a retainer having a concave end for bearing on the enlargement, whereby the valve is hung to the rod so as to be free to swing thereon in any direction, all substantially as specified.

3. The combination of the valve-casing, the pipe B, having beneath the valve-casing a lateral valve-opening and valve, the main valve F, and mechanism, substantially as specified, whereby on the closing of said main valve the lateral valve in the pipe B is opened, and is closed on the opening of said main valve, all substantially as specified.

In testimony whereof I have signed my name to this specification in the presence of two subscribing witnesses.

WILLIAM T. BATE.

Witnesses:
WILLIAM F. DAVIS,
HARRY SMITH.